(12) United States Patent
Okubo et al.

(10) Patent No.: US 7,267,876 B2
(45) Date of Patent: Sep. 11, 2007

(54) RESIN-COATED SAND

(75) Inventors: Akihiro Okubo, Takasaki (JP); Tatsunosuke Murakami, Takasaki (JP); Fumitoshi Takeuchi, Takasaki (JP); Koki Shiduka, Takasaki (JP)

(73) Assignee: Gun Ei Chemical Industry Co., Ltd., Gunma-Ken, Takasaki-Shi (JP)

( * ) Notice: Subject to any disclaimer, the term of this patent is extended or adjusted under 35 U.S.C. 154(b) by 0 days.

(21) Appl. No.: 10/816,538

(22) Filed: Mar. 31, 2004

(65) Prior Publication Data

US 2004/0197558 A1 Oct. 7, 2004

(30) Foreign Application Priority Data

Apr. 1, 2003 (JP) .............................. 2003-098142

(51) Int. Cl.
*B32B 5/16* (2006.01)
(52) U.S. Cl. .................. 428/407; 427/222; 427/226
(58) Field of Classification Search ................ 428/403, 428/407, 404
See application file for complete search history.

(56) References Cited

U.S. PATENT DOCUMENTS

| | | | | |
|---|---|---|---|---|
| 4,051,301 A | * | 9/1977 | Laitar | ........................ 428/404 |
| 4,345,003 A | * | 8/1982 | Matsushima et al. | ....... 428/327 |
| 4,452,926 A | * | 6/1984 | Matsushima et al. | ....... 523/145 |
| 4,694,905 A | * | 9/1987 | Armbruster | .............. 166/280.2 |
| 4,713,294 A | * | 12/1987 | Armbruster et al. | ........ 428/404 |
| 4,888,240 A | * | 12/1989 | Graham et al. | ............. 428/403 |
| 5,422,183 A | * | 6/1995 | Sinclair et al. | ............. 428/403 |
| 5,996,682 A | | 12/1999 | Cai et al. | |
| 6,335,097 B1 | * | 1/2002 | Otsuka et al. | .............. 428/407 |
| 6,528,157 B1 | * | 3/2003 | Hussain et al. | ............. 428/325 |

FOREIGN PATENT DOCUMENTS

| | | | |
|---|---|---|---|
| GB | 753164 | | 7/1956 |
| JP | 55-094750 | * | 7/1980 |
| JP | 55-094750 A | | 7/1980 |
| JP | 55094750 | | 7/1980 |
| JP | 58090346 | | 5/1983 |
| JP | 02-147146 A | | 6/1990 |
| JP | 04-200838 A | | 7/1992 |
| JP | 08-010896 | * | 1/1996 |
| JP | 08-090151 | | 4/1996 |
| JP | 11-309542 A | | 11/1999 |
| JP | 2001-347339 | | 12/2001 |
| JP | 2001-347339 A | | 12/2001 |
| WO | WO-96/14203 A1 | | 5/1996 |

* cited by examiner

*Primary Examiner*—H. Thi Le
(74) *Attorney, Agent, or Firm*—Darby & Darby

(57) ABSTRACT

The resin-coated sand is produced by coating the surface of a refractory granular aggregate with a thermosetting resin and a thermoplastic resin. When using this resin-coated sand, a mold with a less rough surface can be produced by a RP molding apparatus. When using this mold made of the resin-coated sand, a casting with fewer gas defects can be produced.

14 Claims, No Drawings

RESIN-COATED SAND

BACKGROUND OF THE INVENTION

1. Field of the Invention

The present invention relates to a resin-coated sand and, more particularly, to a resin-coated sand suited for use in a laser sintering type rapid prototyping (RP) molding apparatus (laminate shaping apparatus).

This application claims priority based on Japanese Patent Application No. 2003-098142 filed on Apr. 1, 2003, the disclosure of which is incorporated by reference herein.

2. Background Art

In the production of castings, there has hitherto been widely used a so-called shell mold process of using a mold formed by charging a resin-coated sand, which is obtained by coating a refractory granular aggregate such as silica sand with a binder made of a phenolic resin, in a heated die.

This shell mold process is suited for mass production because a die is used in the production of a mold. However, in the case of multi-product production in small lots or the production of prototypes, the die must be fabricated each time, and thus the cost increases and many days are required to produce the die.

Under these circumstances, intense interest has been shown towards a RP system (rapid prototyping system) capable of directly forming a three-dimensional configuration input on a CAD (Computer Aided Design) system as a solid model (three-dimensional model) without machining using no die. As one of the RP systems, there is exemplified a laminate shaping method comprising repeating the step of applying a resin-coated sand on a work table to form a thin layer, and irradiating the thin layer with active energy ray such as a laser to form a sintered thin layer, and thus forming a mold. See, for example, Published Japanese Translation No. Hei 9-500845 of the PCT Application (WO 96/14203). In the laminate shaping method, a resin-coated sand for a shell mold has hitherto been diverted as it is, or there has been used a resin-coated sand wherein the amount of a phenolic resin to be coated is increased as compared with the case used for the shell mold process so as to cope with a poor strength.

In the laminate shaping method, however, the resulting mold may have a rough surface because of insufficient heat of laser during laser sintering (during laminate shaping). In particular, the undercut portion (portion with no support, the mold surface facing downward) has a very rough surface.

When using a resin-coated sand of the prior art, a phenolic resin increases the strength of the mold, but is converted into a gas when decomposed by heat of the molten metal during the production of a casing. Therefore, when the amount of the phenolic resin is increased so as to cope with a poor strength, the strength of the resulting laminate shaped article is improved. However, there arises a problem that the amount of a decomposed gas evolved from the phenolic resin (mold) increases and the gas penetrates into the molten metal, thus increasing gas defects of the resulting casting (product).

Therefore, use of such a RP system using the resin-coated sand is not increasing because the resulting casting is inferior in quality as compared with a shell mold process as a method of the prior art.

Under these circumstances, an object of the present invention is to provide a resin-coated sand which makes it possible to produce a mold with a less rough surface in a RP system and to produce a casing with fewer gas defects.

SUMMARY OF THE INVENTION

The present inventors have intensively researched a laminate shaping method so as to achieve the above object and found that the phenolic resin is merely melted by laser sintering and the curing reaction hardly proceeds, and particles of molding sand are bonded to each other only by solidifying after the completion of laser irradiation. In this case, the phenolic resin was cured by a treatment of heating at 170 to 250° C. (secondary baking) which is carried out after shaping by laser irradiation.

Since the molecular weight of a thermosetting resin increases by the curing reaction, a thermosetting resin having comparatively low molecular weight is used before the curing reaction. Therefore, sufficient bonding strength cannot be obtained only by melting and solidifying the thermosetting resin, resulting in poor strength. This fact has also been found by the present inventors.

The present inventors have performed further research and concluded that a thermoplastic resin is employed so as to cope with poor bonding strength.

The resin-coated sand of the present invention comprises a refractory granular aggregate, and a coating layer coating the surface of the granular aggregate with a thermosetting resin and a thermoplastic resin.

The resin-coated sand is preferably produced by coating the surface of the granular aggregate with the thermosetting resin and further coating with the thermoplastic resin.

In this case, the coating layer preferably comprises a thermosetting resin layer containing the thermosetting resin, with which the surface of the granular aggregate is coated, and a thermoplastic resin layer containing the thermoplastic resin, with which the outer surface of the thermosetting resin layer is coated.

The thermoplastic resin is preferably at least one selected from polyethylene, polypropylene, polyethylene glycol, polyamide, polymethyl methacrylate and polystyrene.

Preferably, the thermoplastic resin can at least disappear partially from the resin-coated sand by a heat treatment at 200° C. for 1 to 7 hours.

The amount of the thermoplastic resin added is preferably from 0.01 to 1.0 parts by mass with respect to 100 parts by mass of the granular aggregate.

A refractory temperature of the granular aggregate is preferably not lower than 1000° C.

A particle size of the granular aggregate is preferably not less than 10 µm and not more than 300 µm.

A softening point of the thermosetting resin is preferably not lower than 70° C. and not higher than 130° C. and the amount of thermosetting resin added is preferably from 1.0 to 4.0 parts by mass with respect to 100 parts by mass of the granular aggregate.

As described above, when using the resin-coated sand of the present invention in an RP system (formation of a mold by laminate shaping), the resulting mold has less rough surface and thus a casting with less gas defects can be produced. Therefore, the resin-coated sand of the present invention is suited for use in a RP system.

PREFERRED EMBODIMENTS

The resin-coated sand of this embodiment is produced by coating the surface of a refractory granular aggregate with a thermosetting resin and a thermoplastic resin. The resin-coated sand of this embodiment comprises a refractory granular aggregate, and a coating layer for coating the surface of the granular aggregate with a thermosetting resin and a thermoplastic resin.

The refractory granular aggregate used in this embodiment has refractory properties which survive casting, and a proper particle size suited for a mold. Examples thereof include, but are not limited to, special sand such as olivine sand, zircon sand, chromite sand and alumina sand; and slag particles such as ferrochrome slag, ferronickel slag and converter slag; including silica sand. These refractory granular aggregates may be used alone or in combination. These refractory granular aggregates may be new sand or reclaimed sand. The reclaimed sand may be those obtained by a mechanical wear or roasting method.

Examples of the thermosetting resin used in this embodiment include phenolic resin, melamine resin and urea resin. Among these thermosetting resins, a phenolic resin is preferable. As the phenolic resin, a novolak resin and a resole resin can also be used and the novolak resin is more preferable. When using the novolak resin as the thermosetting resin, a curing agent is added. As the curing agent, known any curing agents may be used. Examples of the curing agent include hexamethylenetetramine, glyoxal and paraformaldehyde.

The thermosetting resin used in this embodiment is preferably solid at normal temperature.

The amount of the thermosetting resin used in this embodiment is preferably from 1.0 to 4.0 parts by mass, and more preferably from 1.5 to 3.5 parts by mass, with respect to 100 parts by mass of the refractory granular aggregate.

Examples of the thermoplastic resin used in this embodiment include polyethylene, polypropylene, polyethylene glycol, polyamide, polymethyl methacrylate (PMMA) and polystyrene. Among these thermoplastic resins, polyethylene, polypropylene, polyethylene glycol and PMMA are preferable.

These thermoplastic resins preferably has a mass-average molecular weight (relative to polystyrene standards) as measured by gel permeation chromatography within a range from 2,000 to 10,000.

It is preferable that at least a part of the thermoplastic resin used in this embodiment can be removed from the resin-coated sand by a heat treatment at 200° C. for 1 to 7 hours. As used herein, the sentence "can at least disappear partially from the resin-coated sand by a heat treatment at 200° C. for 1 to 7 hours" means that the amount of the thermoplastic resin in the resin-coated sand at least decreases, or the thermoplastic resin at least disappears when the resin-coated sand containing the thermoplastic resin is subjected to a heat treatment at 200° C. for 1 to 7 hours, and this disappearance may be caused by thermal decomposition, run-off or volatilization. It is assumed that this disappearance is caused by such a mechanism that the thermoplastic resin is thermally decomposed to produce a fragment and then the fragment is volatilized.

This disappearance can be confirmed by a decrease in the weight of the resin-coated sand before and after the heat treatment, and a decrease or a disappearance of methylene groups originating from the thermoplastic resin due to IR.

The amount of the thermoplastic resin is preferably from 0.01 to 1.0 parts by mass, and more preferably from 0.05 to 0.5 parts by mass, with respect to 100 parts by mass of the refractory granular aggregate.

When using the thermosetting resin in combination with the thermoplastic resin as a binder of the resin-coated sand, the strength of the laminate shaped article (before secondary baking) obtained after irradiation with active energy ray is improved.

The resin-coated sand of this embodiment is obtained by coating the surface of the refractory granular aggregate with a mixture of the thermosetting resin and the thermoplastic resin, that is, the coating layer may be formed of the mixture of the thermosetting resin and the thermoplastic resin. More preferably, the resin-coated sand is obtained by coating the surface of the refractory granular aggregate with the thermosetting resin and then coating the outer surface of the resulting coating layer with the thermoplastic resin, that is, when the resin-coated sand comprises a thermosetting resin layer with which the surface of the granular aggregate is coated, and a thermoplastic resin layer with which the outer surface of the thermosetting resin layer is coated, the strength of the laminate shaped article (before secondary baking) obtained after irradiation with active energy ray can be improved.

The resin-coated sand of this embodiment can contain flow improvers, metal powders, metal oxides and silane coupling agents, in addition to the refractory granular aggregate, the thermosetting resin and the thermoplastic resin.

Examples of the flow improver include calcium stearate. Examples of the metal powder include powders of metals such as iron, copper, zinc, aluminum and nickel. Examples of the metal oxide include oxides of metals such as metals described above, cobalt and titanium. Examples of the silane coupling agent include aminosilane and epoxysilane.

The resin-coated sand of this embodiment is produced by adding a thermosetting resin to a refractory granular aggregate heated previously to a temperature of 140 to 150° C., kneading the mixture for about 15 to 90 seconds, and optionally adding a curing agent (curing catalyst), followed by kneading, addition of a thermoplastic resin and further kneading.

Since the crosslinking reaction proceeds when the mixture is allowed to stand under the condition of high temperature for a long time after the addition of the thermosetting resin, cooling is started at a proper stage where the mixture was kneaded after the addition of the thermoplastic resin.

This cooling process can be carried out by utilizing latent heat of vaporization of water after the addition of a proper amount of water. In this case, the curing agent may be added in a state of an aqueous solution, thereby to simultaneously carry out uniform mixing and start of cooling of the curing agent.

The cooling process is preferably carried out within 5 minutes after the addition of the thermosetting resin so that the curing reaction of the thermosetting resin does not proceed excessively.

When the mixture is kneaded after the addition of water, the kneaded mixture is massive while water is remained. When water is vaporized, the mass is collapsed and then converted into dry sand. In the case of adding the flow improver such as calcium stearate, it is preferably added and mixed after collapse of the mass.

The RP molding method using the resin-coated sand will now be described.

First, in accordance with a mold model fabricated by CAD, a computer was made to record a cross-sectional shape of the model cut horizontally at predetermined intervals, for example, a cross-sectional shape of a sliced model having a thickness of 0.2 mm.

Using an application apparatus, the resin-coated sand was spread over a platform in the thickness described above, and then the resin (thermosetting resin and thermoplastic resin)

portion of the resin-coated sand is melted by irradiating only the portion, where a cross-sectional shape of an bottommost layer of the model exists, with a laser. After the irradiation with a laser, the molten resin portion is cooled and solidified, and thus refractory granular aggregates are bonded to the resin to form an bottommost layer of the mold model. The resin-coated sand was spread in order in the thickness described above, and then the operation of irradiating only the portion, where the cross-sectional shape of the mold model exists, with a laser is repeated from the bottommost layer to the uppermost layer of the model.

Consequently, it is made possible to obtain a resin-coated sand wherein only the portion of the mold model recorded in the computer is melted and solidified. The portion, which is not irradiated with a laser, is composed of original resin-coated sand in the form of mutually separated granules. Therefore, when non-molten resin-coated sand is removed, it is made possible to obtain a laminate shaped article wherein the resin of the resin-coated sand is melted and solidified in accordance with the shape of the mold model. The respective layers are firmly bonded to each other by melting the resin when the upper layer is irradiated with a laser, and then solidifying the resin.

The thermosetting resin of the molten and solidified article (laminate shaped article) thus obtained is subjected to the curing reaction to form a mold. The thermosetting resin is subjected to the curing reaction by secondary baking of heating at 170 to 250° C. for several hours. The heating temperature and the heating time in the secondary baking may be appropriately controlled according to the size and shape of the mold to be obtained.

In the RP molding, according to this embodiment, there can be used a resin-coated sand wherein the amount of the thermosetting resin (such as phenolic resin) added, which is the same as that in case for a shell mold process, is from 2 to 3 parts by mass with respect to 100 parts by mass of the refractory granular aggregate. When using the resin-coated sand of this embodiment, the resin-coated sand is excellent in bonding strength because the thermoplastic resin is added even if the amount of the phenolic resin is the same as that in the case for the shell mold process. Therefore, when transferred to a secondary baking apparatus after the irradiation with a laser, peeling from the undercut portion does not occur. Therefore, a mold with a good surface can be obtained and also a casting obtained by using the same has good surface. The reason is assumed to be as follows. That is, since the thermosetting resin has a low molecular weight (for example, the mass-average molecular weight is about 300 to 1000), whereas the thermoplastic resin generally has a high molecular weight, a high bonding strength can be achieved by the addition of a small amount of the thermoplastic resin even if the thermosetting resin is not subjected to the curing reaction.

In the resin-coated sand of this embodiment, since the amount of the thermoplastic resin added is smaller than that of the thermosetting resin, less influence is exerted on gas defects of the casting.

If the thermoplastic resin can at least disappear partially from the resin-coated sand by a heat treatment at 200° C. for 1 to 7 hours, the amount of the thermoplastic resin decreases, or the thermoplastic resin disappears during the secondary baking, and thus the amount of an organic substance remaining in the resulting mold decreases.

In the resin-coated sand of this embodiment, since the amount of the thermosetting resin is almost the same as that in the case of a conventional shell mold process, excess gas defects may not occur.

When using the resin-coated sand of this embodiment, the mold has good surface and thus the resulting casting has good surface. The reason is assumed that the binding strength between the refractory granular aggregates during laminate shaping was improved by the addition of the thermoplastic resin, thus, peeling from the undercut portion does not occur, and it is also possible to suppress the amount of gas generated during teeming to almost the same extent as that in the case of a conventional shell mold process.

EXAMPLES

The embodiments will be described in detail by way of Test Examples and Comparative Examples. In the following Test Examples and Comparative Examples, parts are by mass unless otherwise specified.

Test Example 1

To 8000 parts of refractory granular aggregate (Flattery sand, manufactured by MC KOHSAN Co., Ltd.) heated previously to 150° C., 160 parts of a novolak type phenolic resin (trade name: PSM-6407, manufactured by Gunei Chemical Industry Co., Ltd.) as a thermosetting resin was added and the mixture was kneaded by a speed muller manufactured by Enshu Tekko Co., Ltd. for 60 seconds, followed by the addition of an aqueous solution prepared by dissolving 32 parts of hexamethylenetetramine as a curing agent in 120 parts of water, and further kneading. Then, 16 parts of a low density polyethylene (manufactured by Wako Pure Chemical Industries, Ltd.) as a thermoplastic resin was added and the mixture was kneaded. The resulting kneaded mixture is heavy while water remains and, when water is evaporated, the mass is converted into dry sand. After the kneaded mixture was converted into sand, 8 parts of calcium stearate as a flow improver and as a blocking inhibitor were added, followed by mixing for 10 seconds. In such a manner, a resin-coated sand (RCS1) wherein the surface of the refractory granular aggregate is coated with the thermosetting resin and the outer surface is coated with the thermoplastic resin was obtained.

Test Example 2

In the same manner as in Test Example 1, except that the same amount of polystyrene (trade name: Styrene Polymer, manufactured by Wako Pure Chemical Industries, Ltd., polymerization degree: about 3,000) was used in place of the polyethylene as the thermoplastic resin, a resin-coated sand (RCS2) wherein the surface of the refractory granular aggregate is coated with the thermosetting resin and the outer surface thereof is coated with the thermoplastic resin was obtained.

Test Example 3

In the same manner as in Test Example 1, except that the same amount of polyethylene glycol (manufactured by Wako Pure Chemical Industries, Ltd., mass-average molecular weight: about 7,500) was used in place of the polyethylene as the thermoplastic resin, a resin-coated sand (RCS3) wherein the surface of the refractory granular aggregate is coated with the thermosetting resin and the outer surface thereof is coated with the thermoplastic resin was obtained.

Test Example 4

In the same manner as in Test Example 1, except that the same amount of NAIGAI CERABEADS 60#1450 (trade name, manufactured by Naigai Ceramics Co., Ltd.) as a mullite aggregate was used in place of the Flattery sand as the refractory granular aggregate, a resin-coated sand (RCS4) wherein the surface of the refractory granular aggregate is coated with the thermosetting resin and the outer surface is coated with the thermoplastic resin was obtained.

Comparative Example 1

In the same manner as in Test Example 1, except that the polyethylene (thermoplastic resin) was not added, a resin-coated sand (RCS5) wherein the surface of the refractory granular aggregate is coated with the thermosetting resin was obtained.

Comparative Example 2

In the same manner as in Comparative Example 1, except that the amount of the novolak type phenolic resin (trade name: PSM-6407, manufactured by Gunei Chemical Industry Co., Ltd.) as the thermosetting resin was increased to 400 parts, a resin-coated sand (RCS6) wherein the surface of the refractory granular aggregate is coated with the thermosetting resin was obtained.

Molding Conditions

Molds 1 to 6 for an automotive engine cylinder head were produced by laminate shaping of the resin-coated sand (RCS1 to RCS6) obtained described above under the conditions of the thickness of a single layer of 0.2 mm and laser output of 50 W, followed by secondary baking at 200° C. for 3 hours. As a RP system molding method, EOSINT S700 (trade name, manufactured by Electro Optical Systems Co., Ltd.) was used.

Evaluation of Mold Surface and Casting Surface

Using the molds 1 to 6 produced under the above molding conditions, aluminum castings (automotive engine cylinder heads) 1 to 6 were produced at a molten metal temperature of 700° C.

Each surface of the resulting molds 1 to 6 and castings 1 to 6 was visually observed and the mold surface and casting surface were evaluated according to the following criteria. The results are shown in Table 1.

Mold Surface:
A: good
B: collapse (peeling) was observed
Casting Surface
A: good
B: poor (rough)
C: very poor (very rough)

Measurement of Compression Strength

Under the same molding conditions except that the secondary baking is not carried out, test pieces 1 to 6 in size of diameter 50 mm×length 50 mm were produced by laminate shaping of the resin-coated sand (RCS1 to RCS6) and then the compression strength was measured by the test procedure HM-1 of JACT (Japanese Association of Casting Technology). The results are shown in Table 1.

Measurement of Amount of Mold Gas Evolved

After weighing 5 g from the test pieces 1 to 6, the amount of a mold gas evolved was measured by the test procedure M-5 of JACT "Procedure for Measurement of Amount of Gas evolved". The results are shown in Table 1.

Peeling of the Undercut Portion

Under the same molding conditions except that the secondary baking is not carried out, T-shaped molds 1 to 6 comprising two square rods having a section size of 20 mm×20 mm a length of 100 mm (T-shaped molds obtained by bonding a top of a vertical bar composed of one square rod at the center of a horizontal bar composed of the other square rod) were produced by laminate shaping of the resin-coated sand (RCS1 to RCS6) and, immediately after the laminate shaping, it was visually observed whether or not peeling of the undercut portion (lower surface of the horizontal rod of the T-shaped mold) occurred.

The peeling of the undercut portion was evaluated according to the following criteria. The results are shown in Table 1.

TABLE 1

|  | Test Examples | | | | Comparative Examples | |
| --- | --- | --- | --- | --- | --- | --- |
|  | 1 | 2 | 3 | 4 | 1 | 2 |
| Material | RCS1 | RCS2 | RCS3 | RCS4 | RCS5 | RCS6 |
| Mold surface | Mold 1 | Mold 2 | Mold 3 | Mold 4 | Mold 5 | Mold 6 |
|  | A | A | A | A | C | B |
| Casting surface | Casting 1 | Casting 2 | Casting 3 | Casting 4 | Casting 5 | Casting 6 |
|  | A | A | A | A | C | B |
| Test piece | 1 | 2 | 3 | 4 | 5 | 6 |
| Compression strength (N/mm$^2$) | 1.25 | 1.35 | 1.32 | 1.95 | 0.45 | 1.02 |
| Amount of mold gas evolved (ml/g) | 4.2 | 4.4 | 4.2 | 4.5 | 4.2 | 9.5 |
| T-shaped mold | 1 | 2 | 3 | 4 | 5 | 6 |
| Peeling of the undercut portion | A | A | A | A | C | B |

A: no peeling
B: peeling
C: severe peeling

As is apparent from the results shown in Table 1, in Comparative Example 1 (RCS5 obtained by using the same amount as in case for a conventional shell mold of a phenolic resin without using a thermoplastic resin), the shaped article (test piece 5), after laminate shaping, exhibits a low compression strength and severe peeling of the undercut portion is observed in the T-shaped mold 5. The mold 5 obtained by secondary baking has rough surface and peeling is observed on the surface, and also the casting 6 obtained by using the same has a very rough surface.

In Comparative Example 2 (RCS6 obtained by increasing the amount of a phenolic resin without using a thermoplastic resin), the compression strength of the shaped article (test piece 6) after laminate shaping is improved as compared with Comparative Example 1; however, it does not have sufficient strength. In the T-shaped mold 6, peeling of the undercut portion is observed, although the degree of peeling is better than that of Comparative Example 1. The resulting mold 6 has a rough surface and peeling is observed on the surface, and also the casting 6 obtained by using the same has a rough surface. Furthermore, the amount of a mold gas evolved in the test piece 6 is by far larger than that in the other resin-coated sand (RCS1 to 5, test pieces 1 to 5) and thus casting defects are supposed to occur.

On the other hand, in Test Examples 1 to 4 using the resin-coated sand (RCS1 to 4) of this embodiment, shaped articles (test pieces 1 to 4) after laminate shaping have high compression strength and peeling of the undercut portion does not occur in the T-shaped molds 1 to 4, and thus the molds 1 to 4 have good surfaces and also castings 1 to 4 obtained by using the molds 1 to 4 have good surfaces. The amount of the mold gas evolved in the test pieces 1 to 4 is almost the same as that of the resin-coated sand for a conventional shell mold, and thus gas defects are unlikely to occur.

While preferred embodiments of the present invention have been described and illustrated above, it should be understood that these are exemplary of the invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A resin-coated sand comprising:
a refractory granular aggregate, and
a coating on the surface of the granular aggregate formed of a thermosetting resin and a thermoplastic resin, wherein the thermoplastic resin is at least one of polyethylene, polypropylene, polyethylene glycol, polyamide, polymethyl methacrylate and polystyrene; and
wherein the thermoplastic resin can be at least partially removed from the resin-coated sand by heating the resin-coated sand at 200° C. for 1 to 7 hours.

2. The resin-coated sand according to claim 1, wherein the coating is formed of a layer of thermosetting resin coating the surface of the granular aggregate and a layer of thermoplastic resin coating the thermosetting resin layer.

3. The resin-coated sand according to claim 2, wherein the coating consists essentially of:
a layer of a cured thermosetting resin coating the surface of the granular aggregate, and
a layer of thermoplastic resin coating the surface of the cured thermosetting resin layer.

4. The resin-coated sand according to claim 1 or 2, wherein the amount of the thermoplastic resin is from 0.01 to 1.0 parts by mass with respect to 100 parts by mass of the granular aggregate.

5. The resin-coated sand according to claim 1 or 2, wherein a particle size of the granular aggregate is not less than 10 µm and not more than 300 µm.

6. The resin-coated sand according to claim 1 or 2, wherein the thermosetting resin is at least one of phenolic resin, melamine resin and urea resin.

7. The resin-coated sand according to claim 1 or 2, wherein a softening point of the thermosetting resin is not lower than 70° C. and not higher than 130° C.

8. The resin-coated sand according to claim 1 or 2, wherein the amount of thermosetting resin is from 1.0 to 4.0 parts by mass with respect to 100 parts by mass of the granular aggregate.

9. The resin-coated sand according to claim 1 or 2, wherein the thermoplastic resin has a mass-average molecular weight (relative to polystyrene standards) as measured by gel permeation chromatography within a range from 2,000 to 10,000.

10. The resin-coated sand according to claim 1 or 2, further comprising calcium stearate added to the sand as a flow improver.

11. The resin-coated sand according to claim 1 or 2, further comprising metal powder of at least one of iron, copper, zinc, aluminum and nickel added to the sand.

12. The resin-coated sand according to claim 1 or 2, further comprising a metal oxide powder of at least one of iron, copper, zinc, aluminum, nickel, cobalt and titanium added to the sand.

13. The resin-coated sand according to claim 1 or 2, further comprising as a silane coupling agent at least one of aminosilane and epoxysilane added to the sand.

14. The resin-coated sand according to claim 1 wherein the thermoplastic resin is at least one of polyethylene, polypropylene, polyethylene glycol, and polyamide.

* * * * *